United States Patent
Chen et al.

(10) Patent No.: US 12,203,346 B1
(45) Date of Patent: Jan. 21, 2025

(54) METHOD FOR UNDERGROUND SEPARATION OF COMPONENTS IN SULFUR-CONTAINING FLUE GAS AND SEQUESTRATION OF CARBON DIOXIDE AND SULFIDES

(71) Applicant: China University of Petroleum (East China), Qingdao (CN)

(72) Inventors: Fuzhen Chen, Qingdao (CN); Shengnan Wu, Qingdao (CN); Shihao Liu, Qingdao (CN); Yuhang Zhou, Qingdao (CN); Yixuan Liu, Qingdao (CN); Yan Tian, Qingdao (CN); Jianwei Gu, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 18/809,324

(22) Filed: Aug. 20, 2024

(30) Foreign Application Priority Data

Feb. 26, 2024 (CN) .......................... 202410206997.X

(51) Int. Cl.
*E21B 41/00* (2006.01)
*B01D 53/50* (2006.01)
(Continued)

(52) U.S. Cl.
CPC ........ *E21B 41/0064* (2013.01); *B01D 53/507* (2013.01); *B01D 53/523* (2013.01);
(Continued)

(58) Field of Classification Search
CPC ........ E21B 41/0064; E21B 43/34; C09K 8/34
(Continued)

(56) References Cited

U.S. PATENT DOCUMENTS 7,814,975 B2 * 10/2010 Hagen ..................... E21B 43/24
166/266
10,267,128 B2 * 4/2019 Parrella .................. E21B 43/24
(Continued)

FOREIGN PATENT DOCUMENTS

| CN | 102753250 A | 10/2012 |
| CN | 114575800 A | 6/2022 |
| CN | 115646127 A | 1/2023 |

*Primary Examiner* — William D Hutton, Jr.
*Assistant Examiner* — Ashish K Varma
(74) *Attorney, Agent, or Firm* — Nitin Kaushik

(57) ABSTRACT

The present invention disclosed a method for underground separation of components in sulfur-containing flue gas and sequestration of carbon dioxide and sulfides, comprising: injecting sulfur-containing flue gas into injection well which is arranged in a well pattern of a sequestrated aquifer in advance; transiting and injecting formation water into the formation at a first preset injection speed by injection well of the well pattern after injecting the sulfur-containing flue gas for a first preset time, maintaining the first formation pressure, and conducting water drainage and gas production by a production well of the well pattern in a mode of a fixed bottom hole flowing pressure; and determining the well shut-in time according to the nitrogen molar concentration of the production well and conducting well shut-in. The separated $N_2$ is produced, while the separated $CO_2$ and sulfides are sequestered in aquifer, achieving effective underground separation of the flue gas components.

7 Claims, 8 Drawing Sheets

(51) Int. Cl.
  *B01D 53/52* (2006.01)
  *B01D 53/62* (2006.01)
  *B01D 53/78* (2006.01)

(52) U.S. Cl.
  CPC ........... *B01D 53/526* (2013.01); *B01D 53/62* (2013.01); *B01D 53/78* (2013.01); *B01D 2251/402* (2013.01); *B01D 2251/404* (2013.01); *B01D 2252/103* (2013.01); *B01D 2257/302* (2013.01); *B01D 2257/304* (2013.01); *B01D 2257/504* (2013.01); *B01D 2258/0283* (2013.01)

(58) Field of Classification Search
  USPC ......................................................... 166/403
  See application file for complete search history.

(56) References Cited

U.S. PATENT DOCUMENTS

| | | | |
|---|---|---|---|
| 10,989,113 B2 * | 4/2021 | Forrest | F02C 3/28 |
| 11,773,704 B2 * | 10/2023 | Fu | E21B 43/26 |
| | | | 166/266 |
| 2014/0190691 A1 * | 7/2014 | Vinegar | C10G 9/24 |
| | | | 166/272.1 |

* cited by examiner

METHOD FOR UNDERGROUND SEPARATION OF COMPONENTS IN SULFUR-CONTAINING FLUE GAS AND SEQUESTRATION OF CARBON DIOXIDE AND SULFIDES

CROSS-REFERENCE TO RELATED APPLICATIONS

The application claims priority to Chinese patent application No. 202410206997X, filed on Feb. 26, 2024, the entire contents of which are incorporated herein by reference.

TECHNICAL FIELD

The present invention relates to the technical field of oil and gas field development, and particularly to a method for underground separation of components in sulfur-containing flue gas and sequestration of carbon dioxide and sulfides.

BACKGROUND

Currently, the energy required for industrial production and daily life primarily comes from fossil fuels. During the combustion of fossil fuels, a significant amount of flue gas is produced, the main components of which include $N_2$ (approximately accounting for 65%), $CO_2$ (approximately accounting for 15%), sulfides (including $H_2S$, $SO_2$, $SO_3$, etc., approximately accounting for 0.4%), $O_2$, CO, NOx, water vapor, particulate matter dust and ash. Carbon dioxide is the main greenhouse gas, and its massive emissions have caused climate disasters that pose a serious threat to human survival. At the same time, respiratory diseases and acid rain caused by sulfide emissions in flue gas also pose a threat to human health and the ecological environment. Therefore, it is essential to separate, capture, and sequestrate carbon dioxide and sulfides in sulfur-containing flue gas, so as to cope with these issues.

There are currently three main methods for capturing carbon dioxide from flue gas, namely the pre-combustion capture, oxygen enriched combustion capture, and post-combustion capture. Post-combustion capture refers to the capture of carbon dioxide from the flue gas after fuel combustion. This method is the most adaptable one to the existing power generation facilities and is relatively more mature in technology. Therefore, post-combustion capture has become the preferred choice for current CCUS technology. The commonly used methods for separating carbon dioxide from post-combustion flue gas include solution absorption, membrane separation, low-temperature distillation, and solid adsorption. These methods generally have disadvantages such as high investment in ground equipment, complex systems, and low separation efficiency.

Currently, countries around the world have established strict emission standards for the concentration of sulfur dioxide in industrial exhaust gases. Therefore, it is essential to desulfurize sulfides in sulfur-containing flue gas, so as to meet strict emission standards. There are currently various flue gas desulfurization technologies, which can be categorized as the wet process, semi-dry process, and dry process for flue gas desulfurization based on the dry and wet different forms of desulfurization products. The advantages of wet flue gas desulfurization are fast reaction speed and high desulfurization efficiency, but it is highly corrosive to pipelines and equipment, resulting in high maintenance and repair costs for the equipment. The advantage of semi-dry flue gas desulfurization technology is its high efficiency in removing sulfur dioxide, and the desulfurization by-products are in a dry powder state that is easy to recover. However, this method requires higher purity and activity of the desulfurization absorbent. The dry flue gas desulfurization technology is less corrosive to equipment and pipelines, and the process flow is relatively simple. However, this method requires a high level of operation and maintenance.

Therefore, it is essential to separate, capture, and sequestrate carbon dioxide and sulfides before flue gas emissions, so as to cope with the global climate and environmental crisis and meet emission standards. Additionally, it can be seen that the traditional ground separation and capture methods for carbon dioxide and sulfides in flue gas have various disadvantages, such as independent processes, low integration, large equipment investment, complex systems, and poor economic benefits.

SUMMARY

The main objective of the present invention is to provide a method for underground separation of components in sulfur-containing flue gas and sequestration of carbon dioxide and sulfides, in order to solve or partially solve the above problems.

In order to achieve the objective above, the present invention provides a method for underground separation of components in sulfur-containing flue gas and sequestration of carbon dioxide and sulfides, the method comprising:
  injecting sulfur-containing flue gas into an injection well which is arranged in a well pattern of a sequestrated aquifer in advance, the formation water of the sequestrated aquifer being neutral or slightly alkaline, the injection pressure being smaller than or equal to a first preset pressure upper limit, and the well pattern being of a one-injection and one-production well pattern structure arranged in the sequestrated aquifer and forming one-dimensional linear flow or semi-one-dimensional linear flow;
  transiting and injecting formation water into the formation at a first preset injection speed by an injection well of the well pattern after injecting the sulfur-containing flue gas for a first preset time, maintaining the first formation pressure, and conducting water drainage and gas production by a production well of the well pattern in a mode of a fixed bottom hole flowing pressure; and
  determining the well shut-in time according to the nitrogen molar concentration of the production well and conducting well shut-in.

Preferably, in the method for underground separation of components in sulfur-containing flue gas and sequestration of carbon dioxide and sulfides, the first preset pressure upper limit is 44.5 MPa.

Preferably, in the method for underground separation of components in sulfur-containing flue gas and sequestration of carbon dioxide and sulfides, the step of injecting sulfur-containing flue gas into an injection well which is arranged in a well pattern of a sequestrated aquifer in advance, comprises:
  injecting sulfur-containing flue gas into an injection well which is arranged in a well pattern of a sequestrated aquifer in advance, and meanwhile conducting water drainage operation by a production well of the well pattern in a mode of a fixed bottom hole flowing pressure, the injection pressure being less than or equal to 44.5 MPa, and the duration of injecting the sulfur-containing flue gas being 58 days.

Preferably, in the method for underground separation of components in sulfur-containing flue gas and sequestration of carbon dioxide and sulfides, the step of transiting and injecting formation water into the formation at a first preset injection speed by an injection well of the well pattern after injecting the sulfur-containing flue gas for a first preset time, maintaining the first formation pressure, and conducting water drainage and gas production by a production well of the well pattern in a mode of a fixed bottom hole flowing pressure, comprises:

transiting and injecting formation water into the formation at a first preset injection speed by an injection well of the well pattern after injecting the sulfur-containing flue gas for a first preset time, maintaining the first formation pressure, and conducting water drainage and gas production by a production well of the well pattern in a mode of a fixed bottom hole flowing pressure, the first preset injection speed being 10 $m^3$/day, the injection pressure upper limit being 44.5 MPa, the injection duration being 270 days, and the fixed bottom hole flowing pressure being 8 MPa.

Preferably, in the method for underground separation of components in sulfur-containing flue gas and sequestration of carbon dioxide and sulfides, the step of determining the well shut-in time according to the nitrogen molar concentration of the production well and conducting well shut-in, comprises:

conducting well shut-in when the nitrogen molar concentration of the production well is lower than 95%.

Preferably, in the method for underground separation of components in sulfur-containing flue gas and sequestration of carbon dioxide and sulfides, the formation water of the sequestrated aquifer contains calcium ions and magnesium ions.

Preferably, in the method for underground separation of components in sulfur-containing flue gas and sequestration of carbon dioxide and sulfides, the porosity of the sequestrated aquifer is greater than 0.1.

Preferably, in the method for underground separation of components in sulfur-containing flue gas and sequestration of carbon dioxide and sulfides, the cap rock of the sequestrated aquifer is not lower than one fifth of the aquifer in thickness, and the minimum thickness is not less than 5 m.

In order to achieve the above aim, the present invention further provides a prediction method for a nitrogen separation efficiency of sulfur-containing flue gas, and the prediction method comprises:

providing different aquifer pressures and aquifer temperatures respectively, and conducting nitrogen separation by using the above method for underground separation of components in sulfur-containing flue gas and sequestration of carbon dioxide and sulfides;

calculating nitrogen separation rates corresponding to different aquifer pressures and temperatures;

drawing a nitrogen separation efficiency chart of sulfur-containing flue gas based on aquifer pressures, aquifer temperatures, and corresponding nitrogen separation rates; and determining the nitrogen separation efficiency of sulfur-containing flue gas based on the pre-established nitrogen separation efficiency chart of sulfur-containing flue gas, aquifer pressures, and aquifer temperatures.

The present invention at least has the following beneficial effects:

The method for underground separation of components in sulfur-containing flue gas and sequestration of carbon dioxide and sulfides provided by the present invention comprises the following steps: injecting sulfur-containing flue gas into an injection well which is arranged in a well pattern of a sequestrated aquifer in advance, the formation water of the sequestrated aquifer being neutral or slightly alkaline, the injection pressure being smaller than or equal to a first preset pressure upper limit, and the well pattern being of a one-injection and one-production well pattern structure arranged in the sequestrated aquifer and forming one-dimensional linear flow or semi-one-dimensional linear flow; transiting and injecting formation water into the formation at a first preset injection speed by an injection well of the well pattern after injecting the sulfur-containing flue gas for a first preset time, maintaining the first formation pressure, and conducting water drainage and gas production by a production well of the well pattern in a mode of a fixed bottom hole flowing pressure; and determining the well shut-in time according to the nitrogen molar concentration of the production well and conducting well shut-in, thus achieving integration of flue gas component separation and sequestration, and improving separation and sequestration efficiency.

Furthermore, the present invention directly injects sulfur-containing flue gas into the underground aquifer, and synchronously achieves the component separation and sequestration of carbon dioxide and sulfides in the aquifer, thereby replacing the traditional ground separation and underground sequestration modes of flue gas components, achieving the integration and systematization of flue gas component separation and sequestration, and improving separation and sequestration efficiency.

Compared with the traditional mode of separating ground components of sulfur-containing flue gas and sequestrating them underground, the present invention couples the separation of sulfur-containing flue gas components and sequestrating them underground, and synchronously completes both processes in the aquifer. In terms of separating sulfur-containing flue gas components, the present invention abandons complex ground separation methods, greatly reducing economic costs and shortening separation time. In terms of treating sulfides, the present invention also avoids the risk of sulfide leakage, achieving significant savings in both manpower and material resources, while also achieving green and environmentally friendly treatment of flue gas. Therefore, from the perspectives of economy, technology, and environmental protection, the present invention can achieve good results and provide a new idea for achieving the national carbon peaking and carbon neutrality goals.

The realization of the aim, function features and advantages of the present invention will be further described by reference to the embodiments and the figures.

DETAILED DESCRIPTION OF THE EMBODIMENTS

The term "and/or" in the embodiments of the present invention describes an association relationship for describing associated objects and represents that three relationships may exist. For example, A and/or B may represent the following three cases: Only A exists, both A and B exist, and only B exists. The symbol "/" generally indicates an "or" relationship between the associated objects.

It should be noted that the terminologies in the Description and claims of the present invention as well as the drawings herein, including "first", "second" and the like, are used to distinguish among similar objects, rather than describing a specific sequence or an order of precedence.

The term "multiple" in the embodiments of the present invention means two or more, similarly to other quantifiers.

In order to clarify the aim, technical solution and advantages of the embodiments of the present invention, detailed description on the embodiments of the present invention will be provided below in conjunction with the drawings. However, an ordinary person skilled in the art can understand that many technical details have been proposed in various embodiments of the present invention to help readers better understand the present invention. The technical solution to be set forth by the present invention can still be achieved even without these technical details and various changes and modifications based on the following embodiments. The division of the following embodiments is for the convenience of description and should not constitute any limitation on the specific implementation of the present invention. The embodiments can be combined and referenced with each other under the premise of no contradiction.

Figure 8:
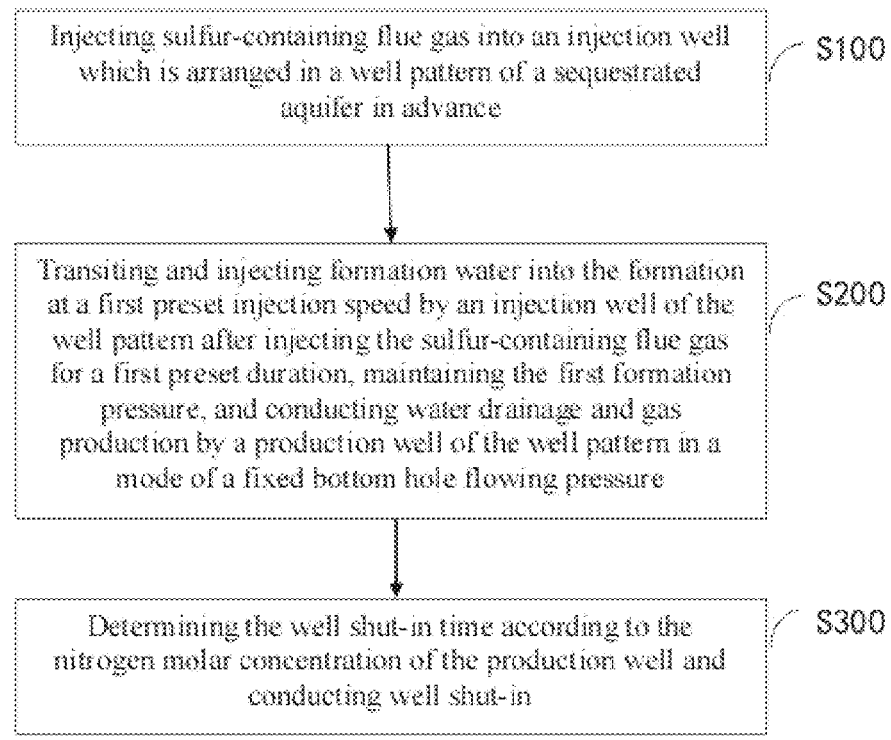
FIG. 8 shows the flow chart of the method for underground separation of components in sulfur-containing flue gas and sequestration of carbon dioxide and sulfides in the present invention.

The present invention provides a method for underground separation of components in sulfur-containing flue gas and sequestration of carbon dioxide and sulfides, as shown in FIG. 8, and the method comprises:

step S100, injecting sulfur-containing flue gas into an injection well which is arranged in a well pattern of a sequestrated aquifer in advance, the formation water of the sequestrated aquifer being neutral or slightly alkaline, the injection pressure being smaller than or equal to a first preset pressure upper limit, and the well pattern being of a one-injection and one-production well pattern structure arranged in the sequestrated aquifer and forming one-dimensional linear flow or semi-one-dimensional linear flow;

In the present embodiment, the preset pressure upper limit is 44.5 MPa.

Specifically, the step S100 comprises:

injecting sulfur-containing flue gas into an injection well which is arranged in a well pattern of a sequestrated aquifer in advance, and meanwhile conducting water drainage operation by a production well of the well pattern in a mode of a fixed bottom hole flowing pressure, the injection pressure being less than or equal to 44.5 MPa, and the duration of injecting the sulfur-containing flue gas being 58 days.

In addition, it should be noted that, before injecting flue gas into the formation, it is necessary to screen the water type of the sequestrated aquifer. The physical and chemical characteristics of formation water include ion composition, mineralization degree, acidity and alkalinity, etc. In terms of acidity and alkalinity, the present invention adopts a neutral or slightly alkaline aquifer (pH≥7, such as $NaHCO_3$ type formation water), so that when flue gas is injected into the aquifer, the carbon dioxide and sulfides in the flue gas can undergo acid-base neutralization reaction with the formation water, and the products are occurred in the formation in solid or dissolved state, thereby achieving geological sequestration of carbon dioxide and sulfides. Meanwhile, nitrogen, which hardly undergoes chemical reactions with formation water and formation minerals, rapidly migrates in the aquifer as a gas and is first produced from the production well, thereby increasing the output and separation efficiency of nitrogen, also increasing the sequestration capacity of carbon dioxide and sulfides, and improving the sequestration efficiency of carbon dioxide and sulfides.

In terms of mineralization, formation water contains various ions and molecules, including carbonates, bicarbonates, sulfates, nitrates, and chlorides of metals such as sodium, potassium, calcium, magnesium, aluminum, and manganese. During the screening process, priority is given to selecting aquifers containing calcium ions, magnesium ions, etc. These ions react with carbonate ions dissolved in formation water to produce calcium carbonate and magnesium carbonate precipitates, thereby improving the sequestration efficiency of carbon dioxide.

Preferably, the formation water of the sequestrated aquifer contains calcium ions and magnesium ions. The porosity of the sequestrated aquifer is greater than 0.1, which can provide a certain storage space. The cap rock of the sequestrated aquifer is not lower than one fifth of the aquifer in thickness, and the minimum thickness is not less than 5 m. Therefore, the effective covering area of the cap rock should be greater than the area of the formation stratum, and meanwhile the sealing of the cap rock needs to be verified through $CO_2$ displacement experiments to prevent leakage. In other embodiments, for aquifers with developed fractures, the permeability needs to be greater than 1 mD; for formations without natural fractures or underdeveloped fractures, the permeability is higher than 10 mD. Therefore, the porous media in aquifers have good filtration capability.

In addition, the higher the content of clay minerals in the cap rock, the higher the $CO_2$ mineralization capture, and the more significant the self-sealing of the cap rock. When the content of clay minerals in the cap rock is too low, the geochemical behavior of montmorillonite minerals undergoes a reversal, from precipitation to dissolution, resulting in a significant decrease in the self-sealing of the cap rock. When the content of clay minerals in the cap rock reaches 50%, the permeability can be reduced by up to 36%, and the effective sealing thickness can reach 70 m. When the content of clay minerals decreases to 10%, the self-sealing of the cap rock significantly decreases, and the effective sealing thickness is 4 m. Therefore, during site selection of the aquifer, it is necessary for the cap rock to have a high clay content, generally no less than 20%, in order to improve the sealing of the cap rock.

For a closed boundary aquifer, it is required that the formation distribution be continuous, with a plate-like structure, a small dip angle, and relative homogeneity. For a constant pressure boundary aquifer, it is required to have an anticline structure or a fault block structure, and there should be no open faults or transverse fracture in the formation. At the same time, it is required that the stress sensitivity of the porous medium in the aquifer is relatively weak.

step S200, transiting and injecting formation water into the formation at a first preset injection speed by an injection well of the well pattern after injecting the sulfur-containing flue gas for a first preset time, maintaining the first formation pressure, and conducting water drainage and gas production by a production well of the well pattern in a mode of a fixed bottom hole flowing pressure;

Specifically, the step S200 comprises:

transiting and injecting formation water into the formation at a first preset injection speed by an injection well of the well pattern after injecting the sulfur-containing flue gas for a first preset time, maintaining the first formation pressure, and conducting water drainage and gas production by a production well of the well pattern in a mode of a fixed bottom hole flowing pressure, the first preset injection speed being 10 m$^3$/day, the injection pressure upper limit being 44.5 MPa, the injection duration being 270 days, and the fixed bottom hole flowing pressure being 8 MPa.

Step S300, determining the well shut-in time according to the nitrogen molar concentration of the production well and conducting well shut-in.

Specifically, the step S300 comprises: conducting well shut-in when the nitrogen molar concentration of the production well is lower than 95%.

The specific principle of chemical sequestration of sulfur-containing flue gas aquifer is as follows:

Injecting sulfur-containing flue gas into underground aquifers usually involves a series of chemical reactions in addition to the physical changes of nitrogen, carbon dioxide, and sulfides mentioned above (dissolution, diffusion, component separation, etc.). Different aquifers contain solid minerals of different rock types and dissolved minerals, which undergo complex chemical reactions with carbon dioxide and sulfides, collectively referred to as geochemical reactions. The present invention divides possible geochemical reactions into two categories: one is the chemical equilibrium reaction in the aqueous phase, and the other is the mineral dissolution/precipitation reaction. The specific geochemical reaction is as shown below.

(1) Chemical Equilibrium Reaction of Flue Gas Components in the Aqueous Phase:

$$CO_2 + H_2O \leftrightarrow H^+ + HCO_3^-$$

$$HCO_3^- \leftrightarrow H^+ + CO_3^{2-}$$

$$SO_2 + H_2O \leftrightarrow H^+ + HSO_3^-$$

$$SO_3 + H_2O \leftrightarrow 2H^+ + SO_4^{2-}$$

$$HSO_3^- \leftrightarrow H^+ + SO_3^{2-}$$

$$H_2S + H_2O \leftrightarrow H^+ + HS^-$$

$$HS^- \leftrightarrow H^+ + S^{2-}$$

(2) Geochemical Reactions Between Flue Gas Components and Rock Minerals $$Calcite + H^+ \leftrightarrow Ca^{2+} + HCO_3^-$$

$$Dolomite + 2H^+ \leftrightarrow Ca^{2+} + Mg^{2+} + 2HCO_3^-$$

$$Kaolinite + 6H^+ \leftrightarrow 5H_2O + 2SiO_2 + 2Al^{3+}$$

$$Illite + 8H^+ \leftrightarrow 5H_2O + 0.6K^+ + 0.25Mg^{2+} + 2.3Al^{3+} + 3.5SiO_2$$

$$Siderite + H^+ \leftrightarrow 3Fe^{2+} + HCO_3^-$$

$$Annite + 10H^+ \leftrightarrow 3Fe^{2+} + K^+ + Al^{3+} + 3.5SiO_2 + 6H_2O$$

$$Calciclase + 8H^+ \leftrightarrow Ca^{2+} + 2Al^{3+} + 2SiO_2 + 4H_2O$$

$$Ca^{2+} + SO_4^{2-} \leftrightarrow CaSO_4$$

$$Ca^{2+} + SO_3^{2-} \leftrightarrow CaSO_3$$

$$Ca^{2+} + CO_3^{2-} \leftrightarrow CaCO_3$$

The geochemical reactions that occur when sulfur-containing flue gas is injected into an aquifer include, but are not limited to, the series of chemical reactions mentioned above. When sulfur-containing flue gas is injected into the formation, as carbon dioxide and sulfides continue to dissolve in the formation water, the density of saturated carbon dioxide and sulfides in the formation water increases continuously and migrates in a columnar form to the bottom of the aquifer, forming up-down convection, that is, plume phenomenon. The plume phenomenon accelerates the speed and range of geochemical reactions in aquifers. Unsaturated formation water continues to dissolve carbon dioxide and sulfides, and undergoes chemical equilibrium reactions in the aqueous phase, producing $H^+$, $CO_3^{2-}$, $SO_4^{2-}$, $SO_3^{2-}$ etc., which react with $Ca^{2+}$, $Fe^{2+}$, $Mg^{2+}$ etc. in the formation water to produce mineral precipitation, thereby achieving the mineralization and solid-state sealing of carbon dioxide and sulfides in the aquifer. Meanwhile, $N_2$ hardly undergoes geochemical reactions, which promotes the separation of $N_2$, $CO_2$ and sulfides in the aquifer.

The method for underground separation of components in sulfur-containing flue gas and sequestration of carbon dioxide and sulfides provided by the present invention comprises the following steps: injecting sulfur-containing flue gas into an injection well which is arranged in a well pattern of a sequestrated aquifer in advance, the formation water of the sequestrated aquifer being neutral or slightly alkaline, the injection pressure being smaller than or equal to a first preset pressure upper limit, and the well pattern being of a one-injection and one-production well pattern structure arranged in the sequestrated aquifer and forming one-dimensional linear flow or semi-one-dimensional linear flow; transiting and injecting formation water into the formation at a first preset injection speed by an injection well of the well pattern after injecting the sulfur-containing flue gas for a first preset time, maintaining the first formation pressure, and conducting water drainage and gas production by a production well of the well pattern in a mode of a fixed bottom hole flowing pressure; and determining the well shut-in time according to the nitrogen molar concentration of the production well and conducting well shut-in, thus achieving integration and systematization of flue gas component separation and sequestration, and improving separation and sequestration efficiency.

To achieve the purpose above, the present invention provides a prediction method for a nitrogen separation efficiency of sulfur-containing flue gas, and the sulfur-containing flue gas conducts nitrogen separation by using the method for underground separation of components in sulfur-containing flue gas and sequestration of carbon dioxide and sulfides. The prediction method comprises:

step S400, determining the nitrogen separation efficiency of sulfur-containing flue gas based on the pre-established nitrogen separation efficiency chart of sulfur-containing flue gas, aquifer pressures, and aquifer temperatures.

In addition, before the step S400, the prediction method comprises:

step S510, providing different aquifer pressures and aquifer temperatures respectively, and conducting nitrogen separation by using the above method for underground separation of components in sulfur-containing flue gas and sequestration of carbon dioxide and sulfides;

step S520, calculating nitrogen separation rates corresponding to different aquifer pressures and temperatures; and step S530, drawing a nitrogen separation efficiency chart of sulfur-containing flue gas based on aquifer pressures, aquifer temperatures, and corresponding nitrogen separation rates.

Figure 7:
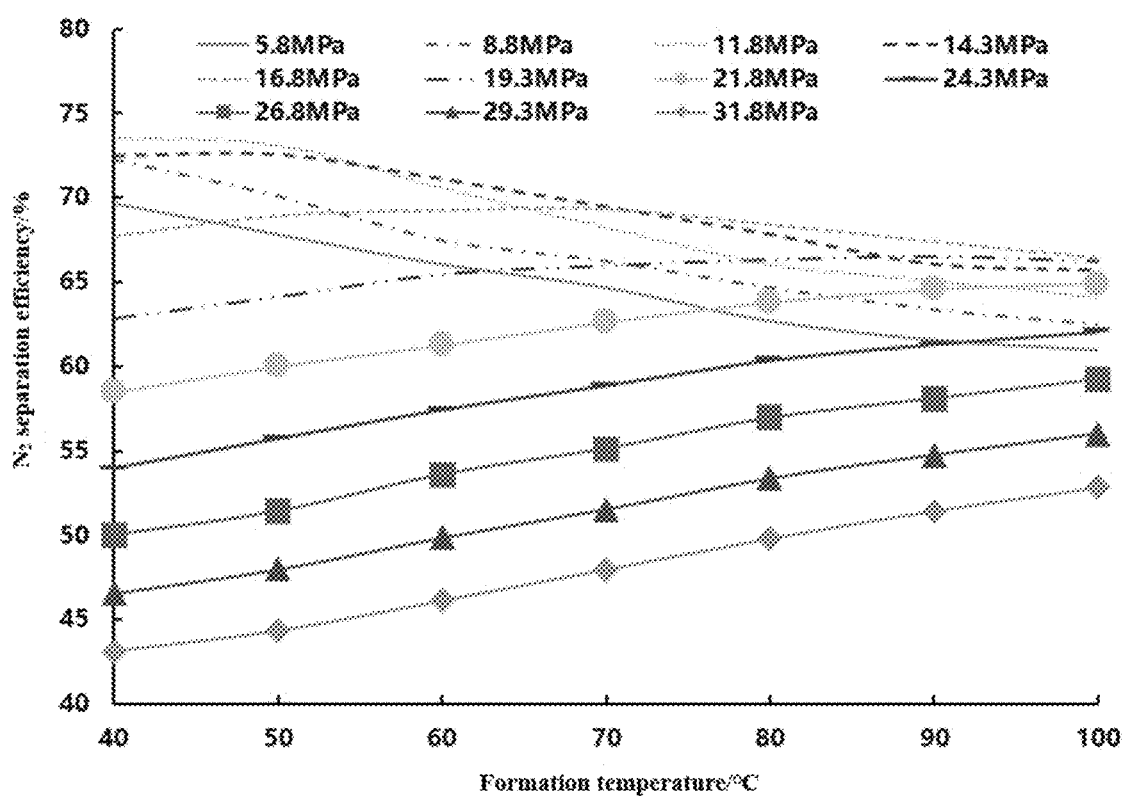
FIG. 7 shows the variation of nitrogen separation efficiency with temperature and pressure conditions in the present invention.

Specifically, taking FIG. 7 as an example, the aquifer pressures are set to 5.8 MPa, 8.8 MPa, 11.8 MPa, 14.3 MPa, 16.8 MPa, 19.3 MPa, 21.8 MPa, 24.3 MPa, 26.8 MPa, 29.3 MPa, 31.8 MPa, and the aquifer temperatures are set to 40° C., 50° C., 60° C., 70° C., 80° C., 90° C., and 100° C., respectively. When the nitrogen molar concentration is set below 95%, the well shut-in is conducted and the nitrogen separation efficiency is simulated and calculated. The results are as shown in FIG. 7.

As shown in FIG. 7, when the formation pressure is lower than 16.8 MPa, the nitrogen separation efficiency decreases with the increase of temperature; when the formation pressure is 16.8 MPa, the nitrogen separation efficiency first increases and then decreases; when the formation pressure is higher than 16.8 MPa, the nitrogen separation efficiency increases with the increase of temperature. This indicates that the nitrogen separation efficiency varies with temperature and the pressure conditions of the aquifer.

Given the temperature and pressure of the potential target sequestrated aquifer, the corresponding nitrogen separation efficiency can be obtained by referring to the chart as shown in FIG. 7, thus achieving accurate prediction of nitrogen separation efficiency under complex temperature and pressure conditions. In addition, the corresponding carbon dioxide and sulfide sequestration efficiencies within the range of temperature and pressure conditions in the chart are all above 99%, and the changes with temperature and pressure conditions are weak, which will not be repeated here.

Embodiment Method for Underground Separation of Components in Sulfur-Containing Flue Gas and Sequestration of Carbon Dioxide and Sulfides For the convenience of explanation, a specific embodiment will be described below. This embodiment adopts a basic well pattern structure of one injection well and one production well, with a distance of 500 m between the injection well and the production well. For situations with a large aquifer area, a well pattern mode combining injection well rows and production well rows can also be used. A numerical simulation model for the sequestration of sulfur-containing flue gas aquifer is established by using CMG numerical simulation software. The sulfur-containing flue gas slug and formation water are injected into the injection well, with the injection time, injection pressure, injection speed, production time, and production rate controlled. Due to the difference in the migration speed of various components in sulfur-containing flue gas, the injected sulfur-containing flue gas slug will undergo component separation during its migration in the aquifer, and ultimately the separated $N_2$ will be produced through the production well (the purity of the separated $N_2$ can be controlled by controlling the well shut-in time of the production well), thereby achieving underground separation of components in underground separation of components in sulfur-containing flue gas and sequestration of carbon dioxide and sulfides. The specific implementation process is as follows.

This embodiment uses CMG numerical simulation software to build a numerical simulation model of an aquifer at 2,200 m underground. The aquifer is continuously distributed in a plate-like structure, with a thickness and width of 50 m and a length of 500 m. It is a horizontal formation and relatively homogeneous. The numerical simulation model divides it into 100×1×1=100 grids according to the XYZ direction. The formation pressure of this aquifer is 21.8 MPa and the formation temperature is 50° C. The porosity of the porous medium in the aquifer is 0.16, which can provide a certain storage space. In terms of permeability, the aquifer has no natural fractures and a formation permeability of 100 mD, demonstrating good filtration capability. The gas-water contact is 2,150 m, and the pH of the aquifer formation water is neutral.

S1, the injection well injects sulfur-containing flue gas (70% $N_2$, 29% $CO_2$, 1% $H_2S$) into the aquifer at the gas injection speed of 1,000 $m^3$/day, and the injection pressure upper limit is 44.5 MPa; one-dimensional linear flow or semi-one-dimensional linear flow of the injected fluid in the formation is achieved by the one-injection and one-production well pattern structure, and the gas injection time of this stage is 58 days. During this process, the production well conducts water drainage operation in a mode of a fixed bottom hole flowing pressure (8 MPa).

S2, the injection well transits and injects formation water into the formation at an injection speed of 10 $m^3$/day from the $59^{th}$ day, and the injection pressure upper limit is 44.5 MPa; the injection time is 270 days, in order to maintain a certain formation pressure. During this process, the production well still conducts water drainage and gas production operations in a mode of a fixed bottom hole flowing pressure (8 MPa), and the highest production speed upper limit of the production well is 1,000 $m^3$/day.

Figure 1:
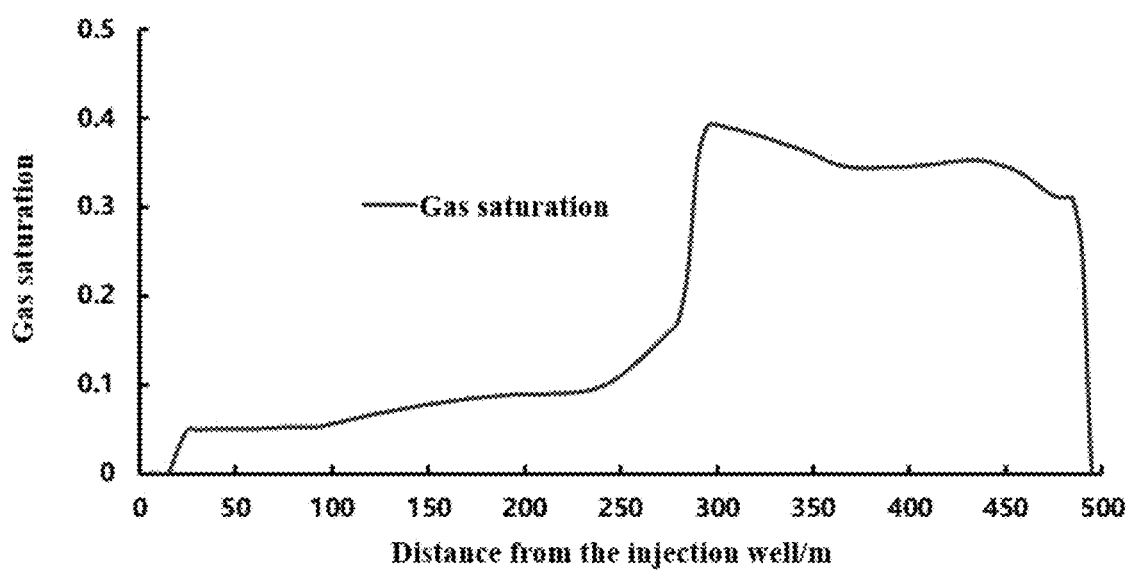
FIG. 1 shows the saturation distribution of sulfur-containing flue gas in the aquifer of the present invention.

The $108^{th}$ day after the start of gas injection is selected as the observation time node for the distribution pattern of underground sulfur-containing flue gas, as shown in FIG. 1. From FIG. 1, it can be seen that the gas saturation is zero at both ends, and there is a sulfur-containing flue gas slug in the middle where the saturation varies with distance. At this point, the gas plug is close to the production well, but has not yet broken through, so there is no gas produced from the production well, and the sulfur-containing flue gas slug is still in the aquifer.

Figure 2:
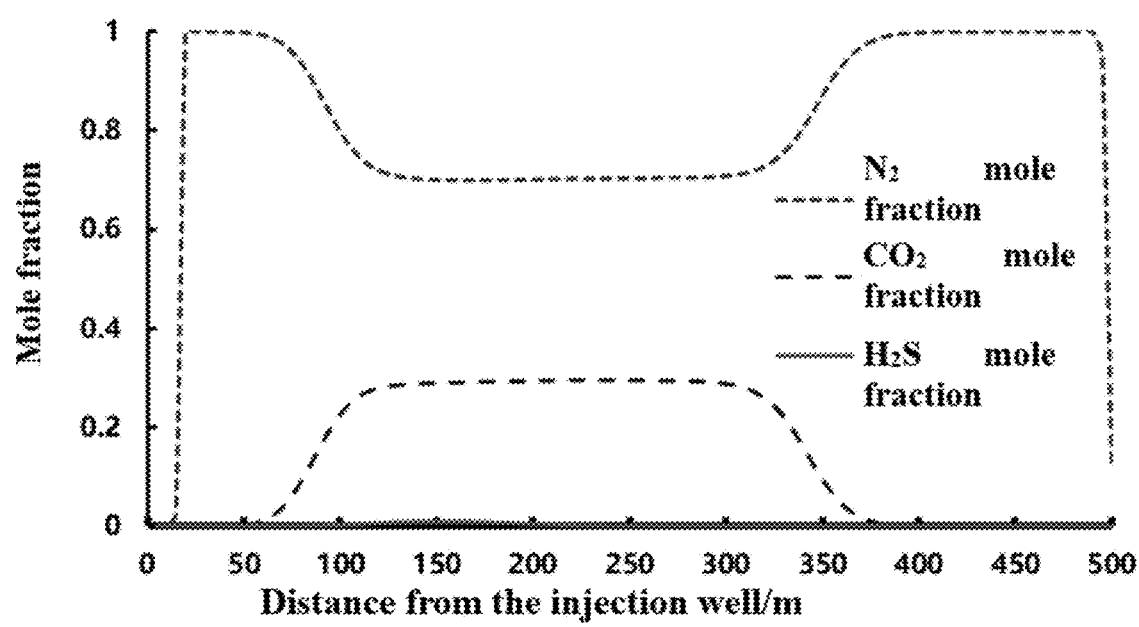
FIG. 2 shows the distribution of gas components in the aquifer of the present invention.
Figure 3:
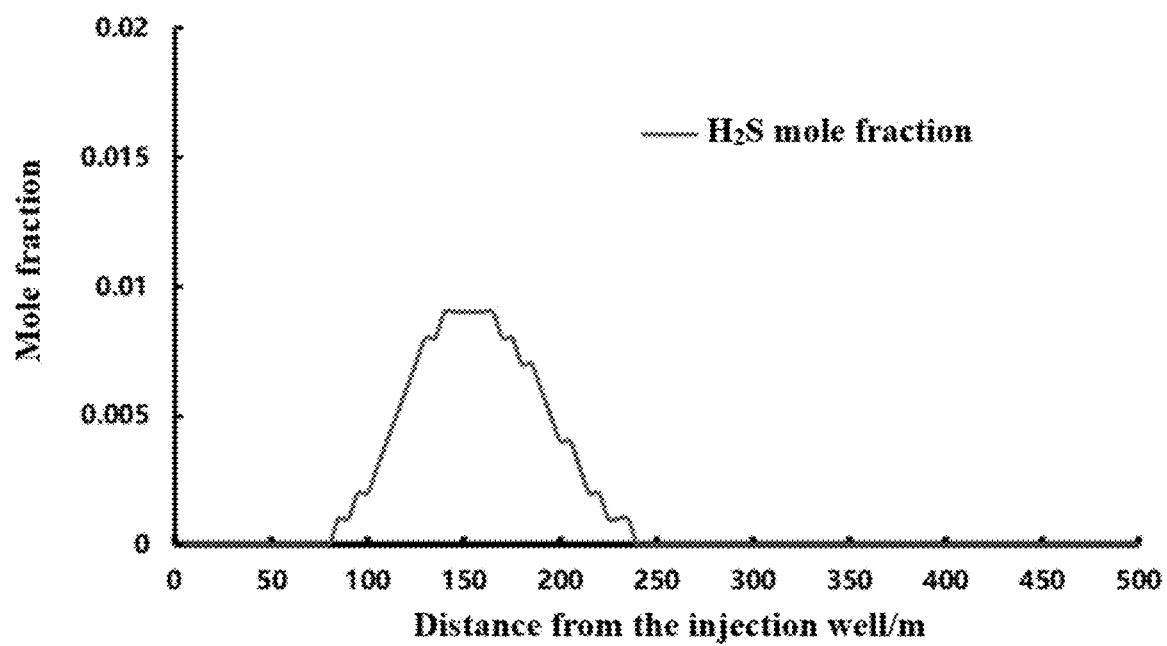
FIG. 3 shows the distribution of $H_2S$ in the aquifer of the present invention.

The distribution patterns of various components in the underground sulfur-containing flue gas on the $108^{th}$ day after the start of gas injection are as shown in FIGS. 2 and 3. From FIG. 2, it can be seen that as the distance from the injection well increases, the mole fraction of $N_2$ first decreases and then increases. The high mole fraction of $N_2$ near the injection well is mainly due to the difficulty of the retained nitrogen to dissolve in the formation water and migrate towards the production well. Starting from a distance of 320 m from the injection well, the mole fraction of $N_2$ gradually increases and eventually approaches 1. In contrast to $N_2$, the mole fraction of $CO_2$ shows an initial increase followed by a decrease. In the middle of the aquifer, the mole fraction of $CO_2$ reaches its maximum value of 0.3. For $H_2S$, due to its low mole fraction (1%) in flue gas, coupled with its high solubility in water and slow migration speed, the overall mole fraction of $H_2S$ is the smallest and distributed at the back of the entire gas slug. Therefore, from FIGS. 2 and 3, it can be seen that after the injected sulfur-containing flue gas migrates in the aquifer for a period of time, it exhibits a clear component separation phenomenon along the fluid filtration direction, with $N_2$ in the front, $CO_2$ in the middle, and $H_2S$ in the back.

When sulfur-containing flue gas migrates in the formation, carbon dioxide and sulfides have high solubility, so they can be dissolved in a large amount in formation water. This phenomenon is more pronounced when the formation water is weakly alkaline. Relatively speaking, nitrogen has a lower solubility and a smaller solubility in formation water. Due to the higher solubility of carbon dioxide and sulfides in formation water compared to nitrogen, the mole fraction of carbon dioxide and sulfides in the gas phase is lower than that of nitrogen.

According to the gas-water phase permeability curve, it can be seen that the gas phase permeability velocity is much higher than the liquid phase permeability velocity. Therefore, nitrogen with higher content in the gas phase migrates faster and reaches the production well first and is produced, while carbon dioxide and sulfides with relatively lower content in the gas phase migrates slower and still remain in the aquifer, thus achieving the separation of sulfur-containing flue gas components in the aquifer.

Figure 5:
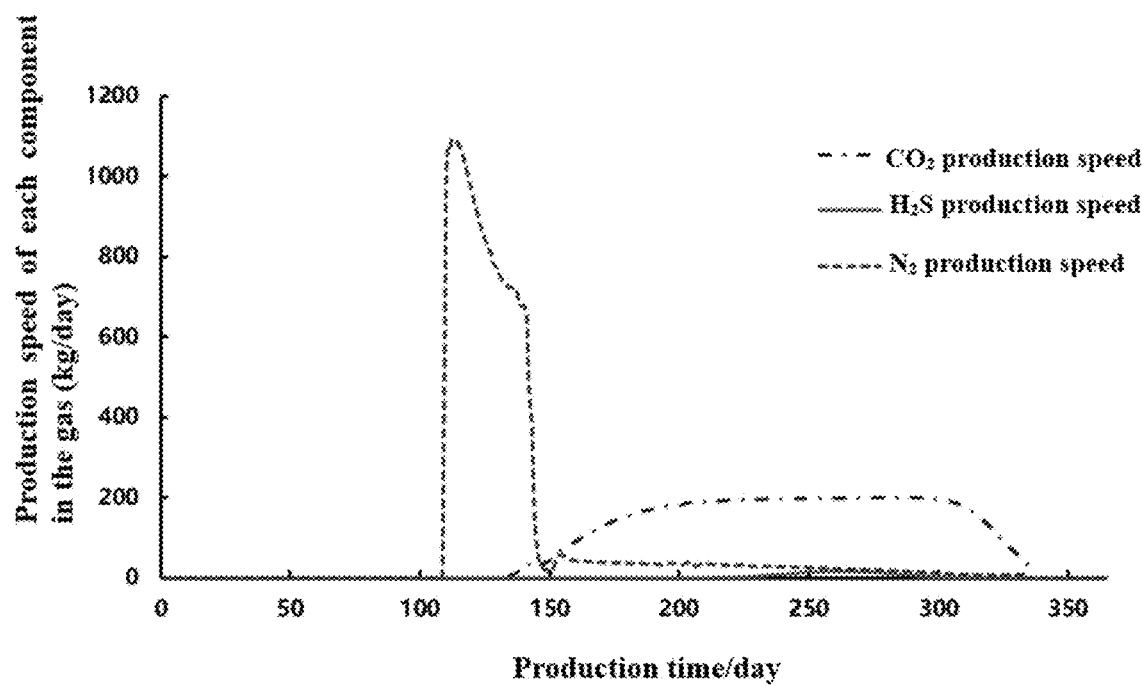
FIG. 5 shows the variation of production speed of each component in the produced gas from the production well of the present invention over time.
Figure 6:
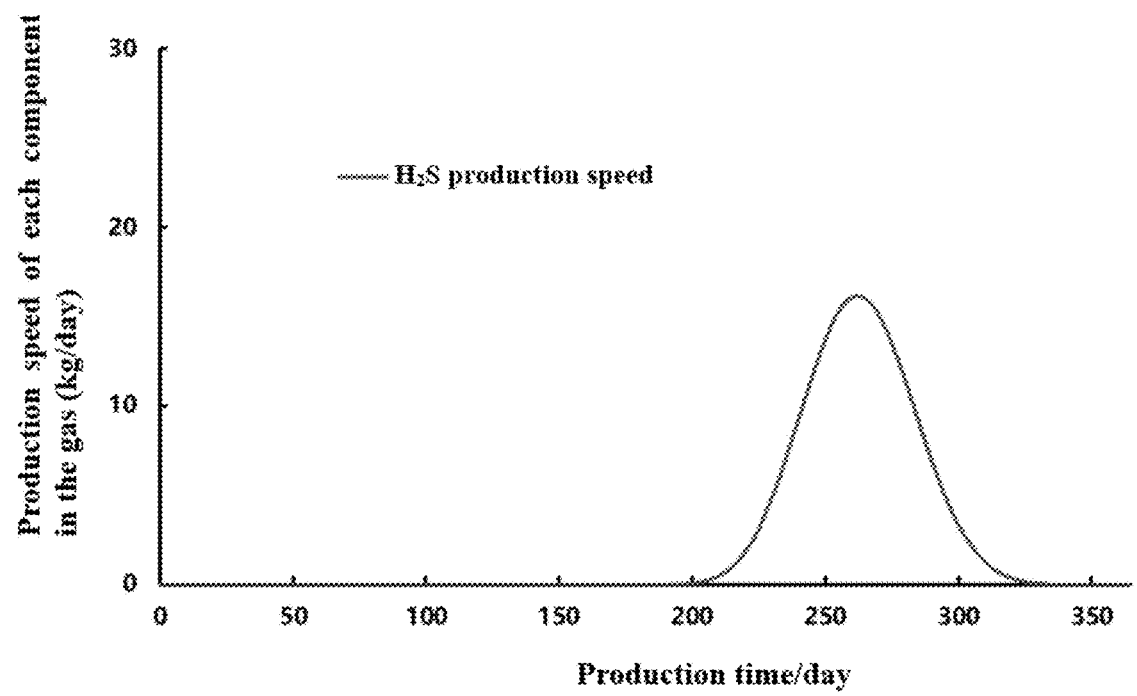
FIG. 6 shows the variation of production speed of each component in the produced gas from the production well over time in FIG. 5.

After 110 days of gas injection, the exemplary model of the present invention produces gas from the production well. With the continuous injection of water into the injection well to maintain the formation pressure, the production well continues to produce a large amount of gas. The mole fraction and mass production of each component of the produced gas are as shown in FIGS. 4, 5, and 6.

Figure 4:
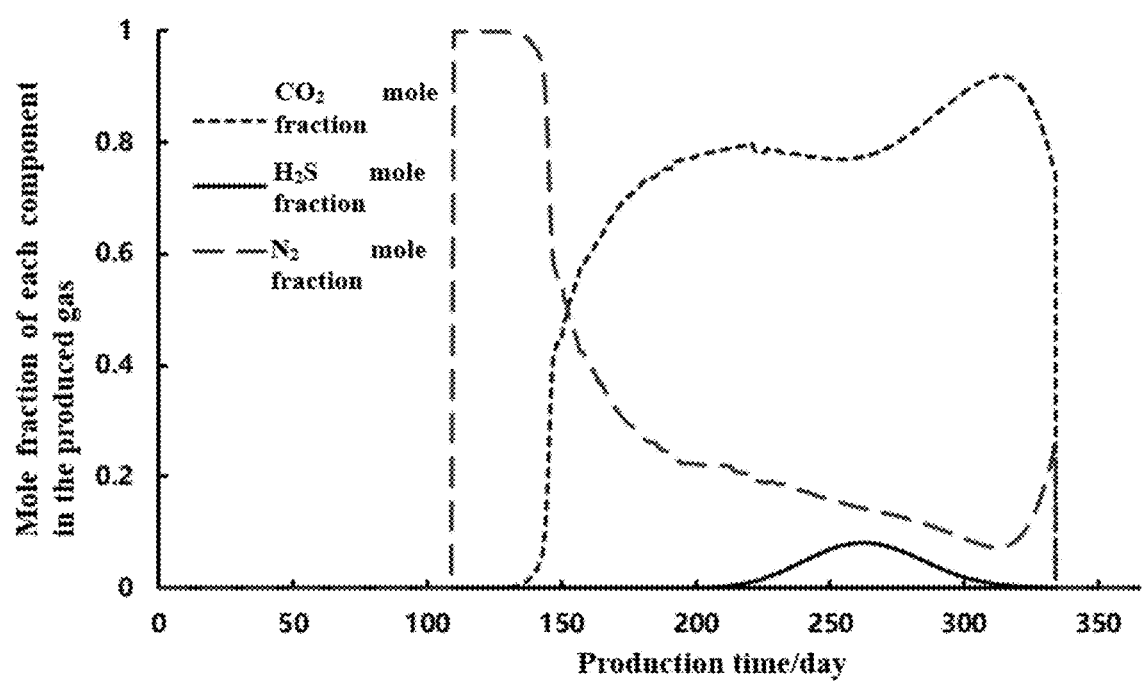
FIG. 4 shows the variation of mole fractions of each component in the produced gas from the production well of the present invention over time.

From FIG. 4, it can be seen that $N_2$ production begins in the production well after 110 days of gas injection, $CO_2$ appears in the produced gas after 137 days of gas injection, and $H_2S$ is produced in the produced gas on the $201^{st}$ day of gas injection. $N_2$, $CO_2$, and $H_2S$ are sequentially produced from the production well, thus verifying the phenomenon of underground separation of components in sulfur-containing flue gas mentioned earlier.

S3, well shut-in is conducted when the nitrogen molar concentration is lower than 95%.

The aim of the present invention is to achieve underground separation of components in sulfur-containing flue gas and underground sequestration of carbon dioxide and sulfide. Therefore, the production well is shut-in before the production concentration of $CO_2$ and $H_2S$ reaches a certain limit, simultaneously achieving underground separation of components in sulfur-containing flue gas and underground sequestration of carbon dioxide and sulfides. Here, it is necessary to select a more reasonable time to shut in the well, and the well shut-in time can be determined based on the nitrogen molar concentration of the production well. Well shut-in is conducted when the nitrogen molar concentration is set to lower than 95% in the present invention. The well shut-in date is the $143^{rd}$ day after gas injection (when the nitrogen molar concentration in the produced gas is below 95% on that day). At this time, the nitrogen separation efficiency is 59%, the carbon dioxide sequestration efficiency is 99.2%, and the sulfide sequestration efficiency is 99.99%.

Specific Application

A certain thermal power plant plans to sequestrate the produced sulfur-containing flue gas in underground aquifers. The target aquifer is located at a distance of 1,200 m, and the aquifer is continuously distributed in a plate-like structure, with a thickness of 50 m, a width of 50 m and a length of 500 m. It is a horizontal formation and relatively homogeneous. The formation pressure of this aquifer is 11.8 MPa and the formation temperature is 40° C. The porosity of the porous medium in the aquifer is 0.16, which can provide a certain storage space. In terms of permeability, the aquifer has no natural fractures and a formation permeability of 100 mD. The porous medium of the aquifer has good filtration capability. The gas-water contact is 1,150 m, and the pH of the aquifer is neutral. The distance from the injection well to the production well is 500 m. This numerical simulation model is built by CMG numerical simulation software to conduct simulations, is it is found that the injected sulfur-containing flue gas achieves effective gas component separation after passing through the aquifer, with a nitrogen separation efficiency of 73.56%. Meanwhile, by reasonably controlling the well shut-in time of the production well, the carbon dioxide sequestration efficiency in the injected sulfur-containing flue gas is 99%, and the sulfide sequestration efficiency is 99.99%. The application results of this example show that both the separation efficiency of sulfur-containing flue gas components and the sequestration efficiency of carbon dioxide and sulfides can meet the actual needs on site. Therefore, the present invention has high technical feasibility.

Apparently, the embodiments as described above are simply parts of the embodiments of the present invention, rather than all of the embodiments. Based on the embodiments of the present invention, an ordinary person skilled in the art can make other variations or changes in different forms without creative work, which are within the protection scope of the present invention.

What is claimed is:

1. A method for underground separation of components in sulfur-containing flue gas and sequestration of carbon dioxide and sulfides, characterized by comprising:
    injecting sulfur-containing flue gas into an injection well which is arranged in a well pattern of a sequestrated aquifer in advance, the formation water of the sequestrated aquifer being neutral or slightly alkaline, the injection pressure being smaller than or equal to a first preset pressure upper limit, and the well pattern being of a one-injection and one-production well pattern structure arranged in the sequestrated aquifer and forming one-dimensional linear flow or semi-one-dimensional linear flow;
    transiting and injecting formation water into the formation at a first preset injection speed by an injection well of the well pattern after injecting the sulfur-containing flue gas for a first preset time, maintaining the first formation pressure, and conducting water drainage and gas production by a production well of the well pattern in a mode of a fixed bottom hole flowing pressure, the first preset pressure upper limit being 44.5 MPa;
    and determining the well shut-in time according to the nitrogen molar concentration of the production well and conducting well shut-in;
    wherein, the step of injecting sulfur-containing flue gas into an injection well which is arranged in a well pattern of a sequestrated aquifer in advance, comprises:
    injecting sulfur-containing flue gas into an injection well which is arranged in a well pattern of a sequestrated aquifer in advance, and meanwhile conducting water drainage operation by a production well of the well pattern in a mode of a fixed bottom hole flowing pressure, the injection pressure being less than or equal to 44.5 MPa, and the duration of injecting the sulfur-containing flue gas being 58 days.

2. The method for underground separation of components in sulfur-containing flue gas and sequestration of carbon dioxide and sulfides according to claim 1, characterized in that, the step of transiting and injecting formation water into the formation at a first preset injection speed by an injection well of the well pattern after injecting the sulfur-containing flue gas for a first preset time, maintaining the first formation pressure, and conducting water drainage and gas production by a production well of the well pattern in a mode of a fixed bottom hole flowing pressure, comprises:

transiting and injecting formation water into the formation at a first preset injection speed by an injection well of the well pattern after injecting the sulfur-containing flue gas for a first preset time, maintaining the first formation pressure, and conducting water drainage and gas production by a production well of the well pattern in a mode of a fixed bottom hole flowing pressure, the first preset injection speed being 10 $m^3$/day, the injection pressure upper limit being 44.5 MPa, the injection duration being 270 days, and the fixed bottom hole flowing pressure being 8 MPa.

3. The method for underground separation of components in sulfur-containing flue gas and sequestration of carbon dioxide and sulfides according to claim 2, characterized in that, the step of determining the well shut-in time according to the nitrogen molar concentration of the production well and conducting well shut-in, comprises:

conducting well shut-in when the nitrogen molar concentration of the production well is lower than 95%.

4. The method for underground separation of components in sulfur-containing flue gas and sequestration of carbon dioxide and sulfides according to claim 1, characterized in that, the formation water of the sequestrated aquifer contains calcium ions and magnesium ions.

5. The method for underground separation of components in sulfur-containing flue gas and sequestration of carbon dioxide and sulfides according to claim 1, characterized in that, the porosity of the sequestrated aquifer is greater than 0.1.

6. The method for underground separation of components in sulfur-containing flue gas and sequestration of carbon dioxide and sulfides according to claim 5, characterized in that, the cap rock of the sequestrated aquifer is not lower than one fifth of the aquifer in thickness, and the minimum thickness is not less than 5 m.

7. A prediction method for a nitrogen separation efficiency of sulfur-containing flue gas, characterized in that the prediction method comprises:

providing different aquifer pressures and aquifer temperatures respectively, and conducting nitrogen separation by using the method for underground separation of components in sulfur-containing flue gas and sequestration of carbon dioxide and sulfides according to claim 1;

calculating nitrogen separation rates corresponding to different aquifer pressures and temperatures;

drawing a nitrogen separation efficiency chart of sulfur-containing flue gas based on aquifer pressures, aquifer temperatures, and corresponding nitrogen separation rates; and determining the nitrogen separation efficiency of sulfur-containing flue gas based on the pre-established nitrogen separation efficiency chart of sulfur-containing flue gas, aquifer pressures, and aquifer temperatures.

* * * * *